Aug. 15, 1961   J. C. AGARWAL   2,996,373
THREE-STAGE FLUIDIZED-REDUCTION PROCESS
Filed March 24, 1959
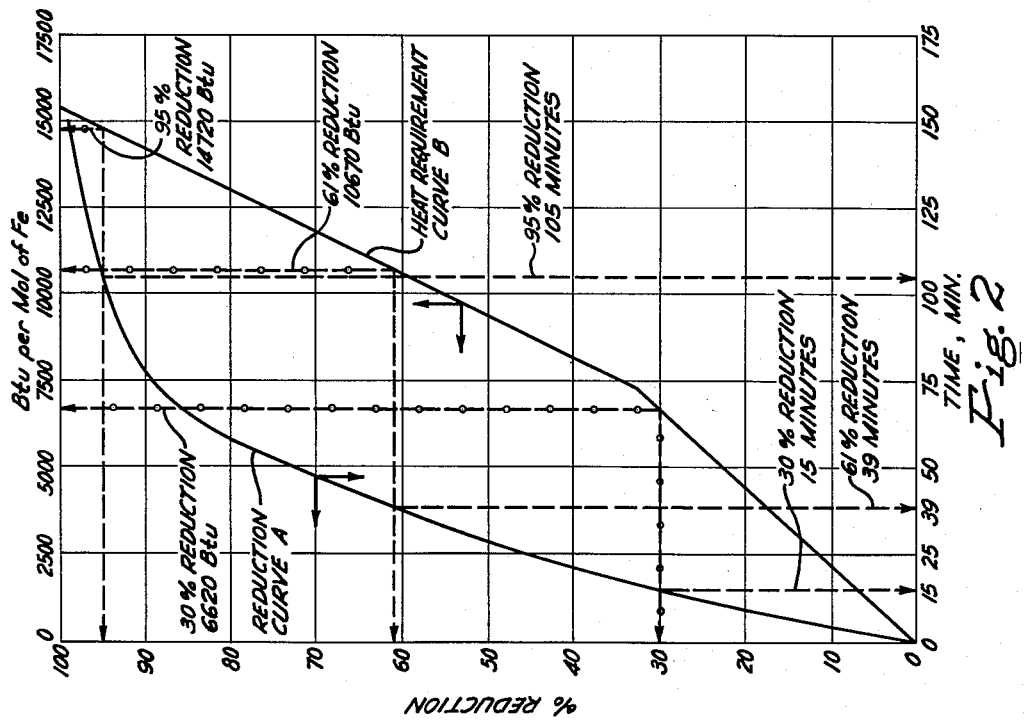
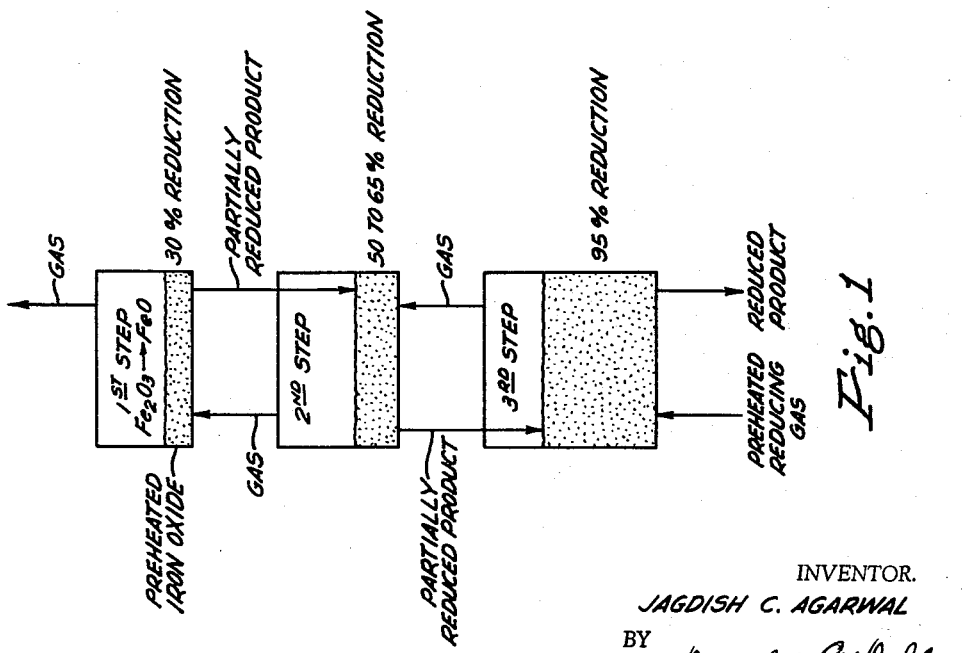
INVENTOR.
JAGDISH C. AGARWAL
BY Donald G. Dalton
ATTORNEY

United States Patent Office 2,996,373
Patented Aug. 15, 1961

2,996,373
THREE-STAGE FLUIDIZED-REDUCTION PROCESS
Jagdish C. Agarwal, Verona, Pa., assignor to United States Steel Corporation, a corporation of New Jersey
Filed Mar. 24, 1959, Ser. No. 801,657
6 Claims. (Cl. 75—26)

This invention relates to an improved continuous direct reduction process for iron oxide in fluidized beds.

In a conventional continuous direct reduction process, preheated iron oxide fines are treated in one or more fluidized beds with ascending currents of preheated reducing gas, commonly hydrogen which can contain up to about 25 percent by volume CO. It is known that such processes advantageously can be conducted in two steps, a first step in which higher oxides are reduced to FeO and a second step in which FeO is reduced to metallic iron. Spent reducing gas from the second step can be used as reductant in the first, since it retains capacity for reducing higher oxides after its constituents approach equilibrium for reducing FeO. Such processes have a disadvantage that they do not readily remove more than about 90 percent of the oxygen originally present in the oxide, even though residence time of solids and gas in the second step is quite prolonged. For example, when one such process is operated with a 6-foot bed in the second step (FeO→Fe) and at a temperature of 1300° F., the product is 89 percent reduced and a 75 percent approach to equilibrium is obtained. Doubling the residence time for gas and solids in the second step produces no significant improvement, the product being about 90 percent reduced at a 78 percent approach to equilibrium.

To remedy this difficulty, it has been proposed to divide the step in which FeO is reduced to metallic iron into two steps in series, making three reduction steps in all, for example as shown in French Patent No. 1,058,821. The theory is that fewer non-reduced particles remain in the final product, since FeO particles which escape reduction in the middle step may be reduced in the third. However, I have found previous three-step processes of this type are impractical, if not actually inoperative, for failure to take into consideration the heat requirements. Reduction of iron oxide with hydrogen is an endothermic reaction, and preferably all necessary heat is supplied by preheating both the oxide and reducing gas. The maximum temperature at which one can maintain a fluidized bed of iron oxide particles reduced 90 percent or more without sticking is about 1300° F. The maximum temperature at which a bed of ore particles can be maintained is higher, but likewise limited. Consequently it is difficult to supply enough heat for the reaction in the middle step without heating the particles to a temperature at which they stick in the first or third steps or in the ore preheater. The chances of unreduced particles discharging from the third step are least when the bed depths and residence time of particles are the same in both the second and third steps, as shown in the prior art, yet my observation has been that such an arrangement cannot operate effectively without sticking.

An object of the present invention is to provide an improved three-step fluidized bed direct reduction process for iron oxide wherein the percentage by which ferrous oxide is reduced in the second and third steps is apportioned in a novel and critical way that produces successful operation.

A more specific object is to provide a process of the foregoing type wherein the percentage of reduction which takes place in the second and third steps is apportioned to control the heat requirements of these steps in a more equitable and operable manner than in previous three-step processes.

In the drawing:
FIGURE 1 is a flowsheet of a three-step reduction process for iron oxide in accordance with my invention; and
FIGURE 2 is a graph showing the time and heat required to reduce $Fe_2O_3$ with hydrogen at 1300° F. in a batch operation.

As shown in FIGURE 1, my process includes three reduction steps in series, each conducted in a respective fluidized bed. In the first step I reduce higher oxide (indicated as $Fe_2O_3$) to a product predominantly FeO. In the second step I partially reduce this product to metallic iron. In the third step I further reduce the product from the second step to a product predominantly metallic iron. The apparatus can be of any suitable type in which ascending currents of reducing gas can fluidize iron oxide fines, as known in the art. The gas flows counter to the iron oxide fines, off-gas from the third step being used as reductant in the second, and off-gas from the second being used as reductant in the first. I preheat the iron oxide fines to about 1700° to 2200° F. before they enter the first reduction step, and the gas to about 1300° to 1600° F. before it enters the third step, using conventional apparatus. In the first step the reaction temperature is about 1350° to 1550° F., and in the second and third steps about 1050° to 1300° F., which temperatures can be maintained without sticking.

The product discharging from the first step (predominantly FeO) is about 30 percent reduced, assuming the feed to be $Fe_2O_3$; that is, in this step I remove about 30 percent of the oxygen originally present in the iron oxide. In accordance with the present invention, I apportion the reduction which takes place in the second and third steps so that the heat requirements of these steps approach equality. I can effect such control with conventional apparatus by regulating the relative residence time or depths of the beds of fluidized solids in the two steps. For example, if I desire a residence time of 5.5 hours in the third step and 2 hours in the second step, I adjust the apparatus so that the bed depths are in the ratio 2.75 to 1.

The way in which I determine the relative bed depths or residence time of particles to apportion the heat requirements of the second and third steps can best be explained by referring to FIGURE 2. Curve A shows the percentage reduction plotted against reaction time in minutes, and curve B the percentage reduction plotted against B.t.u. per mol of Fe, both for $Fe_2O_3$ reduced with hydrogen at 1300 F. in a batch operation. Curve A shows that 30 percent reduction in the first step takes about 15 minutes and curve B that 30 percent reduction requires about 6620 B.t.u. My method can achieve about 95 percent reduction in the final product. Curve A shows that 95 percent reduction takes a total of about 105 minutes, of which the second and third steps combined take about 90 minutes, and curve B that 95 percent reduction requires a total of about 14,720 B.t.u., of which the second and third steps combined require about 8100 B.t.u. When I divide the heat requirement equally between the second and third steps, each requires about 4050 B.t.u. Thus the first and second steps combined require about 10,670 B.t.u., and curve B shows 10,670 B.t.u. can reduce the starting material by about 61 percent. Curve A shows that 61 percent reduction takes about 39 minutes, of which the second step takes about 24 minutes. Thus the third step takes the remainder of the time, or about 66 minutes.

The foregoing relation for batch operation also applies to continuous operation, except that the absolute residence time in each step is considerably longer. For continuous operation about 2 to 4 hours' residence time is required for the second step, and 5.5 to 11 hours for the third step. The reducing gas in the first step is off-gas which has lost most of its capacity to reduce FeO; hence no more than about 30 percent reduction can be achieved in the first step no matter how much this step may be prolonged. The reduction achieved at the end of the second step cannot be increased beyond about 65 percent, since the heat requirements for the second step cannot be met. The advantage of three-step operation is lost if the reduction achieved at the end of the second step is less than about 50 percent. The optimum conditions for different starting materials or temperatures can be determined in a similar manner. Nevertheless the relation of 30 percent reduction at the end of the first step, 50 to 65 percent reduction at the end of the second step, and up to 95 percent reduction at the end of the third step is of general application.

Example I

As a specific example of my process conducted continuously in a commercial size installation, minus 10 mesh Venezuelan ore is predried to remove surface moisture and fed continuously at a rate of 71 tons an hour to a conventional fluidized bed preheater, where it is heated to 2170° F. This ore has a sticking temperature of about 2300° F. and a composition about as follows:

63.1% total iron
26.8% oxygen
3.0% gangue
7.1% ignition loss

Ore from the preheater feeds continuously to a series of three conventional fluidized bed reactors, each 30 feet in diameter, where the respective reduction steps take place. Reducing gas is introduced continuously at a rate of 52,000 s.c.f.m. to a conventional gas preheater where it is heated to 1425° F. Initially the gas has a composition about as follows:

83.7% $H_2$
1.5% $H_2O$
14.8% $N_2$ and inerts

Gas from the preheater is introduced continuously to third reactor, off-gas from the third reactor to the second, and off-gas from the second to the first. In accordance with usual practice off-gas from the first reactor is regenerated, a portion purged to limit build-up of inerts, fresh gas is added, and the mixture of regenerated and fresh gas goes to the gas preheater.

In the first reduction step the operating temperature is 1525° F., the bed depth about 8 feet, and the product about 30 percent reduced. In the second step the operating temperature is about 1300° F., the bed depth 4.5 feet, and the product about 61 percent reduced. In the third step the operating temperature again is 1300° F., the bed depth 12 feet, and the product about 95 percent reduced. The residence time of solids in the third step is about 8 hours at a reducing gas velocity of 1 to 5 feet per second, contrasted with a residence time in the second step of only about 2.9 hours. This relation distributes the heat requirement equally between the second and third steps. The product discharging from the third step is cooled and agglomerated by conventional means.

Example II

In another example of my process the heat requirement is distributed between the second and third steps in the ratio of approximately 1 to 1.6. The quantities and compositions of the ore and reducing gas, the initial gas temperature, and the flow of materials are the same as in the first example. However, the ore is preheated only to 2000 F. and the operating temperature in the first step is only 1450° F. In the second step the operating temperature again is 1300° F., but the bed depth is only 3.75 feet and the product about 55 percent reduced. In the third step the operating temperature again is 1300° F., but the bed depth is now 13 feet, the residence time about 8.5 hours at 1.5 feet per second gas velocity, and the product again is 95 percent reduced. For certain ores this heat distribution is preferable to the equal distribution of Example I, especially for ores that stick at temperatures a little above 2000° F.

From the foregoing description and examples it is seen that my invention affords a practical and operable three-step process for direct reduction of iron oxide. It is critical to the successful operation of such a process that the heat requirement be apportioned properly between the second and third steps. The prior art, exemplified by the aforementioned French patent, shows equal bed depths and residence time in the second and third steps. This arrangement imposes radically unequal heat requirements, since the rate of reduction is substantially higher in the second step than in the third step. If the product of the first step is 30 percent reduced and the product of the third step 95 percent reduced, curve A of FIGURE 2 shows that equal bed depths in the second and third steps would lead to about 82 percent reduction at the end of the second step. Curve B shows that the heat required in the second and third steps would be in the ratio of about 4 to 1. Such heat distribution would necessitate operating the ore preheater at temperatures in excess of 2400° F. to furnish sufficient heat for the reactions in the second step. At such temperatures the ore sticks and the process is inoperable.

While I have described certain preferred ways of practicing my invention, it is apparent other modifications may arise. Therefore, I do not wish to be limited to the disclosure set forth but only by the scope of the appended claims.

I claim:

1. A three-step continuous direct reduction process for iron oxide comprising passing preheated iron oxide fines through a series of three fluidized beds, passing preheated reducing and fluidizing gas through said beds in series counter to the iron oxide, maintaining a temperature of about 1350° to 1550° F. in the first bed and about 1050° to 1300° F. in each of the second and third beds, and controlling the reduction which takes place in each bed so that the product passing to the second bed is predominantly FeO, the product discharging from the third bed is predominantly metallic iron, and the heat required for the reducing reactions in the second and third beds approaches equality.

2. A three-step continuous direct reduction process for iron oxide comprising passing preheated iron oxide fines through a series of three fluidized beds, passing preheated reducing and fluidizing gas through said beds in series counter to the iron oxide, maintaining a temperature of about 1350° to 1550° F. in the first bed and about 1050° to 1300° F. in each of the second and third beds, and controlling the reduction which takes place in each bed so that the product passing to the second bed is about 30 percent reduced, the product passing to the third bed is about 50 to 65 percent reduced, and the product discharging from the third bed is up to about 95 percent reduced.

3. In a three-step continuous process for directly reducing iron oxide wherein iron oxide fines feed to a first fluidizing bed, a partially reduced product predominantly FeO passes therefrom to a second fluidized bed, a further reduced product passes from the second bed to a third fluidized bed, a product predominantly metallic iron discharges from the third bed, and a reducing and fluidizing gas passes through the beds in series counter to the iron oxide, the reducing reactions in each bed being endothermic with the heat requirements supplied by preheating the iron oxide to a temperature of about 1700° to 2200° F. and the gas to a temperature of about 1300° to 1600° F., the improvement which comprises maintaining a temperature of about 1350° to 1550° F. in the first bed and about 1050° to 1300° F. in each of the second and third beds, and apportioning the bed depths and residence time of the partially reduced product in the second and third beds so that the heat required for the reactions in these beds approaches equality and sticking is avoided.

4. A process as defined in claim 3 in which the further reduced product passing to the third bed is about 50 to 65 percent reduced.

5. A process as defined in claim 4 in which the partially reduced product has a residence time of about 2 to 4 hours in the second bed and about 5.5 to 11 hours in the third bed.

6. A process as defined in claim 4 in which the product discharging from the third bed is about 95 percent reduced.

References Cited in the file of this patent

UNITED STATES PATENTS

| 2,481,217 | Hemminger | Sept. 6, 1949 |
| 2,864,688 | Reed | Dec. 16, 1958 |

FOREIGN PATENTS

| 508,600 | Belgium | Feb. 15, 1952 |